(12) United States Patent
Smith

(10) Patent No.: US 6,857,536 B2
(45) Date of Patent: Feb. 22, 2005

(54) SUPPORT DEVICE AND METHOD FOR A ROTARY CLOSURE ASSEMBLY

(75) Inventor: Brian Smith, Woodsetts Worksop (GB)

(73) Assignee: General Signal UK Limited, Stockport (GB)

( * ) Notice: Subject to any disclaimer, the term of this patent is extended or adjusted under 35 U.S.C. 154(b) by 7 days.

(21) Appl. No.: 10/334,917

(22) Filed: Jan. 2, 2003

(65) Prior Publication Data

US 2003/0150864 A1 Aug. 14, 2003

Related U.S. Application Data

(63) Continuation-in-part of application No. 10/073,206, filed on Feb. 13, 2002, now Pat. No. 6,708,837.

(51) Int. Cl.$^7$ .............................................. B65D 45/00
(52) U.S. Cl. ......................... 220/316; 220/293; 49/254
(58) Field of Search ................................. 220/293–303, 220/315–316, 291, 811–813, 816, 345.1; 49/425–427, 254

(56) References Cited

U.S. PATENT DOCUMENTS

| | | | | |
|---|---|---|---|---|
| 2,038,517 A | * | 4/1936 | Alland | 220/816 |
| 2,073,150 A | * | 3/1937 | Goldberg | 220/816 |
| 2,237,528 A | * | 4/1941 | Marasso | 220/816 |
| 2,870,934 A | * | 1/1959 | Hill | 220/816 |
| 2,883,084 A | * | 4/1959 | Shankland | 220/816 |
| 2,942,753 A | * | 6/1960 | Kelton | 220/816 |
| 4,367,823 A | * | 1/1983 | Raver | 220/316 |
| 4,465,202 A | * | 8/1984 | Stoves et al. | 220/316 |
| 4,515,287 A | * | 5/1985 | Baudoux et al. | 220/316 |
| 5,918,756 A | * | 7/1999 | Morgan | 220/291 |
| 6,085,935 A | * | 7/2000 | Malchow et al. | 220/813 |
| 6,708,837 B2 | * | 3/2004 | Smith | 220/316 |

OTHER PUBLICATIONS

"MODCO Pipeline Hinged Closures" Brochure, MODCO Industries, Incorporated, P.O. Box 657, Conroe, Texas 77305, pp. 1–3.

"Press Interlock Technical Papers", Scholz & Co., Scholz–Verschlüsse Brochure, pp. 1–8.

* cited by examiner

*Primary Examiner*—Nathan J. Newhouse
(74) *Attorney, Agent, or Firm*—Baker & Hostetler LLP

(57) ABSTRACT

A closure arrangement comprises a hub 314, a head 320 adapted to be disengage able from the hub 314. A davit arm 300 is mounted on a swivel mount 316 provided on the hub 314, and the swivel mount 316 is arranged to allow the davit arm 300 to swivel in a plane. The davit arm is free to move in a longitudinal direction in the plane, and to rotate about the longitudinal direction. The closure arrangement is further provided with an adjustment device adapted to adjust the position of the head 320 relative to the hub 314 in a direction perpendicular to the plane.

27 Claims, 9 Drawing Sheets

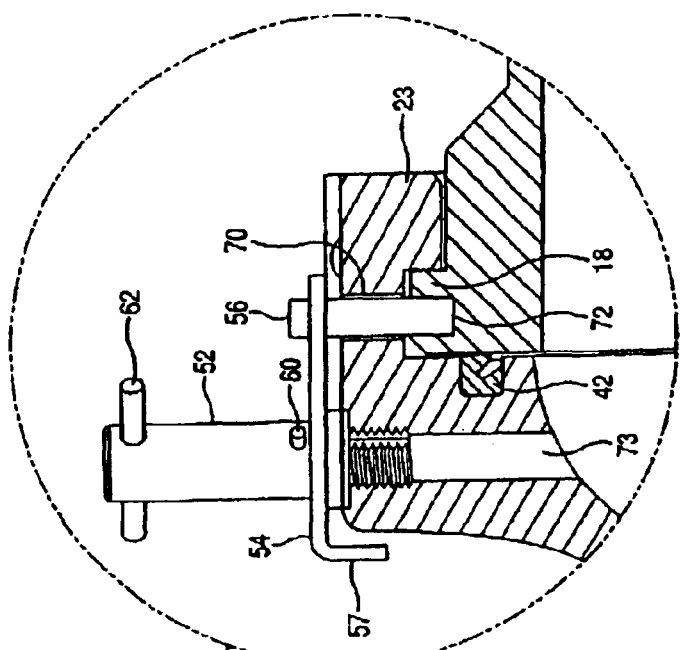
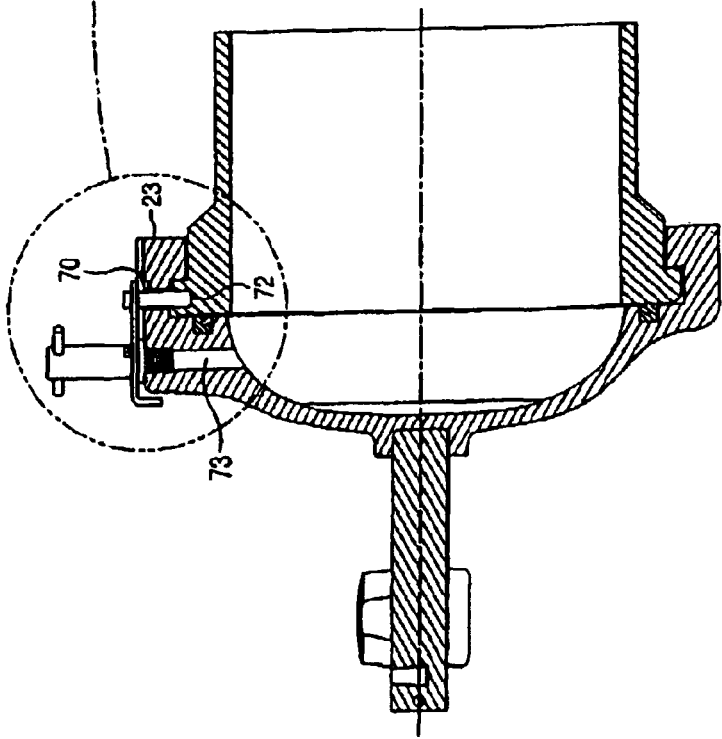
Fig. 6
Fig. 5

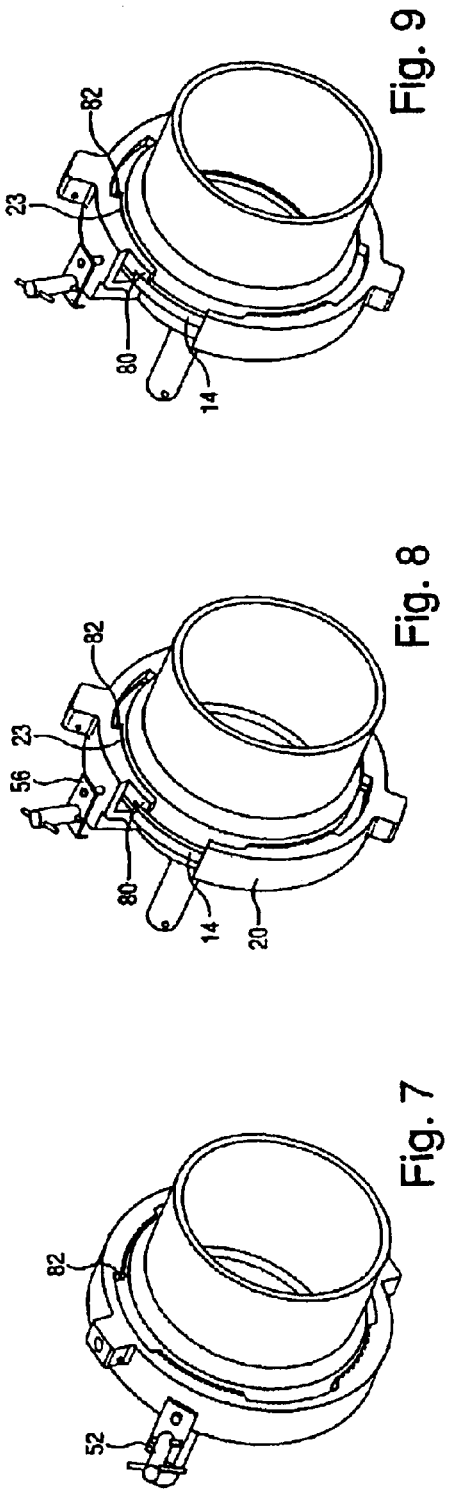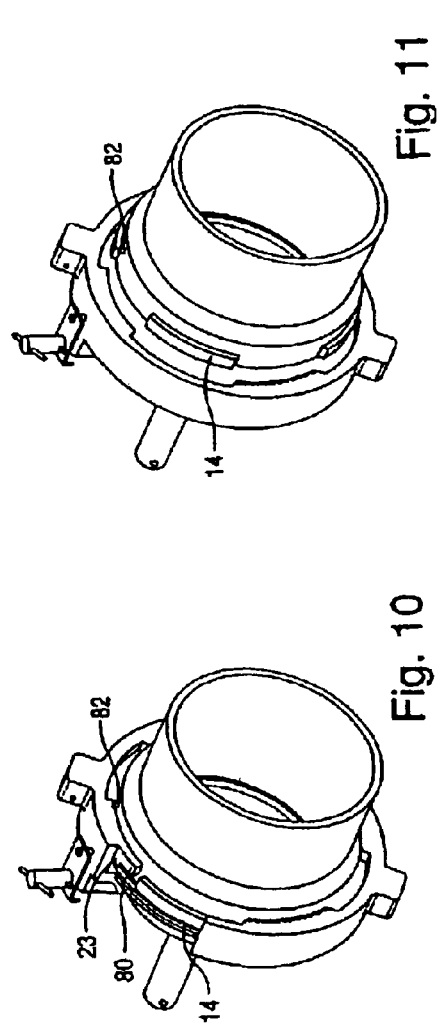

SUPPORT DEVICE AND METHOD FOR A ROTARY CLOSURE ASSEMBLY

PRIORITY

This application is a continuation-in-part, and claims the benefit of, U.S. patent application Ser. No. 10/073,206 now U.S. Pat. No. 6,708,837 filed Feb. 13, 2002, entitled LOCKING SYSTEM AND METHOD FOR ROTARY CLOSURE the disclosure of which is incorporated herein by reference.

FIELD OF THE INVENTION

The present invention relates generally to a support device and method for a closure assembly.

BACKGROUND OF THE INVENTION

In fluid or gas handling systems in industry, particularly pressurized systems, it is known to provide a so-called closure assembly to provide quick and safe access into some part of the interior of the fluid or gas handling system. For example, in the gas and/or chemical industries, it is common for there to be various pipelines arid vessels that generally operate in a pressurized environment. When the systems are not in operation, it is often desirable to have access to the inside of the systems for cleaning, inspection, and/or the changing of filters or other replaceable elements which may be present.

Some applications of closure systems include those in the petrochemical, pharmaceutical and chemical process industries such as blow downs, manways, meter provers, filters, strainers, coalescers, waste disposal vessels, and autoclaves. Typical closures may for example range in diameter from 4 inches to 24 inches, with working pressures up to ANSI 300 (740 psi/51.1 bar) and temperatures from −50 degrees F. to 400 degrees F.

One approach to providing a closure is to provide a flange around an opening at the end of a hub-shaped extension that extends from some part of the fluid handling system. A covering or closing element, which forms a cap often referred to as a head, and which may simply be a disk shape or a dome-shaped piece of material, is removably but securely attached over the flanged opening to provide a fluid-tight and pressure-tight seal when closed. The cover is removable to provide access to the interior of the pressurized system via the opening in the flange.

One way of securing the cover element, or closure, onto the flanged opening has been simply to provide a series of corresponding bolt holes through the cover and around the circumference of the flange so that individual bolts may be inserted through the corresponding holes and tightened. Tightening the bolts presses the circumference of the closure against the flange, and a sealing element such as a gasket may be provided between the closure and the flange. Tightening all the bolts provides closing pressure and a seal at the gasket to resist escaping of the fluid or gas daring system operation. A disadvantage of these bolt type closures is that individually installing and/or removing bolts can be time consuming and cumbersome, particularly where a large number of bolts are required.

Another type of closure is the so-called screw type of closure, in which the flange has a threaded outer surface, and the closing element is shaped like a cap and has a corresponding threaded inner surface. This closure is screwed onto the flange to provide a seal. A disadvantage of screw type closures is that closing the cap usually requires that the cap be rotated many degrees, even several rotations.

A third type of closure is the so-called rotary lug type closure. In this arrangement, the outer circumference of the flange has several lugs projecting outwardly, and the cover or head has grooves and corresponding lugs projecting inwardly. Thus, the head can be oriented at an angle where it can be pushed axially onto the flange. The head can be rotated a specified number of degrees so that the lugs interfere with each other and prevent the head from moving axially. In this arrangement, once the head has been rotated so that the lugs are fully interfering, the head is held pressure-tight against the flange, to resist leakage and pressure.

Lug type rotary systems can be preferable to screw type systems because the cover can be moved from a fully openable to a fully closed position merely by rotating the cover by a partial turn, e.g., by 45 degrees. This can be a more simple operation than the many rotations sometimes required on a screw type closure.

Industrial systems often handle fluids and/or gases at very high pressures. Before accessing these systems via a closure, it is generally known to depressurize the system by means of a main bleed valve located somewhere in the system. It is be desirable to have a safety device to prevent opening of these closures where significant pressure exists inside the system, for example as would occur if the main bleed valve operation has not been performed.

Since these systems sometimes have residual pressures even after the main bleed process has been performed, it can also be desirable for the closure to have some type of safety device to prevent opening of the closure even when a residual internal pressure is present. It may sometimes also desirable to have some arrangement for bleeding out these residual pressures at the location of the closure, so that pressure at the closure can first be bled out, and then opening of the closure can be effected, all at the location of the closure. Thus, there is a need for a system and method that (1) provides a warning to the operator of full and/or residual pressure and/or (2) releases pressure in the region of closure, before the closure can be opened.

SUMMARY OF THE INVENTION

It is therefore a feature and advantage of the present invention to provide a system and method that (1) provides a notification to the operator of full and/or residual pressure, and/or (2) releases pressure in the region of closure, before the closure can be opened. The above and other features and advantages are achieved through the use of a novel system and method as herein disclosed.

According to a first aspect of the invention there is provided a releaseable locking element movable between a locked position that locks the head in a closed position and an unlocked position. A pressure warning device is movable between a sealed position and a warning position and is operably connected to the locking element so that the pressure warning device must be in a warning position in order for the locking element to be unlocked. A support device comprising a swivel mount housing is mounted on said hub and a davit arm mounted in said swivel mount housing and attached to said head at one end, wherein said swivel mount housing is arranged to allow said davit arm to swivel on said hub in a plane and comprises two concave rollers, wherein said davit arm is adapted to cooperate with said concave rollers to allow said davit arm to move in a longitudinal direction in said plane relative to said swivel mount housing and to swivel about said longitudinal direction.

In one embodiment said concave rollers are displaced along said longitudinal direction to support said davit arm, one said concave roller is arranged on an upper side of said davit arm at a position away from said head, and the other said concave roller is arranged on a lower side of said davit arm at a position towards said head.

In one embodiment said pressure warning/release device includes a plate element, and said sealing element includes a threaded screw rotatably mounted in said plate element. The lock element can have a a projection that projects from said plate element.

In one embodiment tightening the screw by a predetermined amount can move said locking element to said locked position and untightening the screw by a predetermined amount moves said locking element into said unlocked position.

In one embodiment the lug type holding arrangement further includes a secondary lug arrangement providing a stepped profile.

In one embodiment the lug type holding arrangement comprises at least one first lug projecting from said hub and a head having at least one second lug projecting from said head, wherein said head is rotatable between an unlocked position where said lugs do not interfere with each other and said head may be removed from said hub, and a closed position where said lugs at least partially overlap each other and interfere with each other so that said head is held in a sealing engagement with said hub; and the apparatus including: a vent bore passing through at least one of said head and said hub; a first locking bore passing through said head; and a second locking bore extending at least partially into said hub that is aligned with said first locking bore when said head is in said closed position; wherein said pressure warning/release device comprises a sealing element adapted to seal the vent bore when in a sealing position and said releaseable lock element comprises a projection that projects into said first and second bores when said head is in said closed position and said sealing element is in said sealing position.

The seal and lock device can include a plate element, and the sealing element can include a threaded screw rotatably mounted in said plate element and threadable into said vent bore to seal said vent bore. The projection can project from said plate element.

In one embodiment tightening said screw by a predetermined amount seals said vent bore, and untightening said screw by a predetermined amount retracts said projection from said second bore. The second lug can include a secondary lug providing a stepped profile.

According to a second aspect of the present invention there is provided a closure arrangement comprising a hub, a head adapted to be disengage able from said hub, a support device adapted to support said head when separated from said hub, wherein said support device comprises a swivel mount arranged on said hub and a davit arm mounted on said swivel mount and attached at one end to said head, wherein said swivel mount is arranged to allow said davit arm to swivel in a plane, and said davit arm is mounted on said swivel mount to move in a longitudinal direction in said plane relative to said swivel mount and to swivel about said longitudinal direction.

In one embodiment said swivel mount comprises two concave rollers. In one embodiment said concave rollers are displaced along said longitudinal direction to support said davit arm, one said concave roller is arranged on an upper side of said davit arm at a position away from said head, and the other said concave roller is arranged on a lower side of said davit arm at a position towards said head.

According to a third aspect of the present invention there is provided a closure arrangement comprising a hub, a head adapted to be disengage able from said hub, a support device adapted to support said head when separated from said hub, wherein said support device comprises a swivel mount arranged on said hub and a davit arm mounted on said swivel mount and attached at one end to said head, wherein said swivel mount is arranged to allow said davit arm to swivel in a plane, said davit arm is mounted on said swivel mount to move in a longitudinal direction in said plane relative to said swivel mount and to swivel about said longitudinal direction, and said support device further comprises an adjustment device adapted to adjust the position of said head relative to said hub in a direction perpendicular to said plane.

In one embodiment said adjustment device is adapted to adjust the angle of inclination of said davit arm relative to said hub in order to adjust the position of said head relative to said hub in a direction perpendicular to said plane. The swivel mount can comprise two concave rollers, and the adjustment device can comprise adjusting means for adjusting the position of at least one said roller. The concave rollers can be displaced along said longitudinal direction, and one said concave roller can be arranged on an upper side of said davit arm at a position away from said head, and the other said concave roller can be arranged on a lower side of said davit arm at a position towards said head, and the said adjusting means can comprise means for lowering said concave roller at said upper side of said davit arm or raising said concave roller at said lower side of said davit arm.

According to a fourth aspect of the present invention there is provided a method for locking a closure assembly in a closed position for use with a hub having an opening therethrough and a head removably attachable to said hub via a lug-type holding arrangement, the method comprising: moving a pressure warning/release device from a sealed position to a warning position, the warning/release device operably connected to a locking device that operates to withdraw a projection from said lug-type holding arrangement, so that said pressure warning/release device must be in a warning position in order for the locking device to be unlocked; and providing a support device comprising a swivel mount housing on said hub and a davit arm mounted in said swivel mount housing and attached to said head at one end, the method comprising providing said swivel mount housing with two concave rollers, using said swivel mount housing to allow said davit arm to swivel on said hub in a plane, using said concave rollers to allow said davit arm to move in a longitudinal direction in said plane relative to said swivel mount housing and to swivel about said longitudinal direction, the method further comprising displacing said concave rollers along said longitudinal direction, arranging one said concave roller on an uppers side of said davit arm at a position away from said head, and arranging the other said concave roller on a lower side of said davit arm at a position towards said head.

According to a fifth aspect of the invention there is provided a method of operating a closure assembly comprising providing a hub, a head adapted to be disengage able from said hub, a support device adapted to support said head when separated from said hub, the method comprising providing said support device with a swivel mount arranged on said hub and a davit arm mounted on said swivel mount and attached at one end to said head, using said swivel mount to allow said davit arm to swivel in a plane, using said swivel mount to allow said davit arm to move in a longitudinal direction in said plane relative to said swivel mount, and using said swivel mount to allow said davit arm to swivel about said longitudinal direction.

According to a sixth aspect of the present invention there is provided a method of operating a closure assembly comprising providing a hub, a head adapted to be disengageable from said hub, a support device adapted to support said head when separated from said hub, the method comprising providing said support device with a swivel mount arranged on said hub and a davit arm mounted on said swivel mount and attached at one end to said head, using said swivel mount to allow said davit arm to swivel in a plane, using said swivel mount to allow said davit arm to move in a longitudinal direction in said plane relative to said swivel mount, and using said swivel mount to allow said davit arm to swivel about said longitudinal direction, the method further comprising providing said support device with an adjustment device to adjust the position of said head relative to said hub in a direction perpendicular to said plane.

There has thus been outlined, rather broadly, the more important features of the invention in order that the detailed description thereof that follows may be better understood, and in order that the present contribution to the art may be better appreciated. There are, of course, additional features of the invention that will be described below and which will form the subject matter of the claims appended hereto.

In this respect, before explaining at least one embodiment of the invention in detail, it is to be understood that the invention is not limited in its application to the arrangements of the components set forth in the following description or illustrated in the drawings. The invention is capable of other embodiments and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

FIG. 5 is a cross sectional view of the assembly in a closed position, taken through line 5—5 of FIG. 3;

FIG. 6 is a detailed cross sectional view of a portion of FIG. 5A;

FIG. 7 is a perspective view of the closure, with the door in a fully closed position;

FIG. 8 is a perspective view of the arrangement of FIG. 6, with the door rotated to a first position;

FIG. 9 is a perspective view with the door rotated to the first position and moved outward axially;

FIG. 10 is a perspective view showing the door rotated to a second position;

FIG. 11 is a perspective view showing the door rotated to the second position of FIG. 9 and also pulled outward axially into an open position;

DETAILED DESCRIPTION OF PREFERRED EMBODIMENTS OF THE INVENTION

The present invention in some embodiments provides a system and method that (1) provides a notification to the operator of full and/or residual pressure and/or (2) releases pressure in the region of closure, before the closure can be opened.

A system and method is provided for locking a lug-type rotary closure assembly in a closed position. The locking arrangement includes a pressure warning device, which may also release internal pressure. The system cannot be unlocked and hence the closure cannot be opened, until the pressure warning device has been moved to a position where it will warn of internal pressure.

Figure 1:
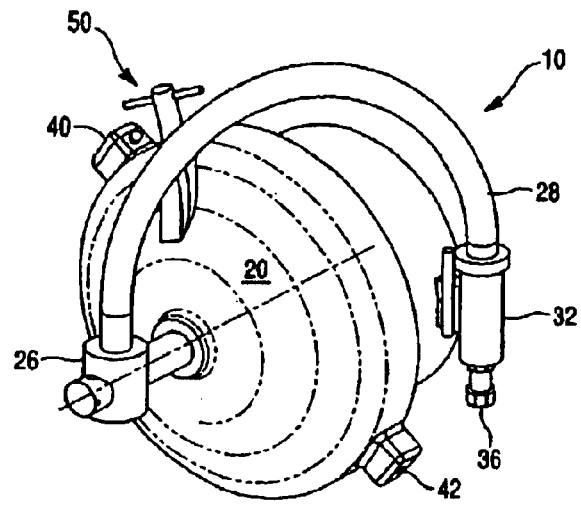
FIG. 1 is a perspective view of a closure assembly.
Figure 2:
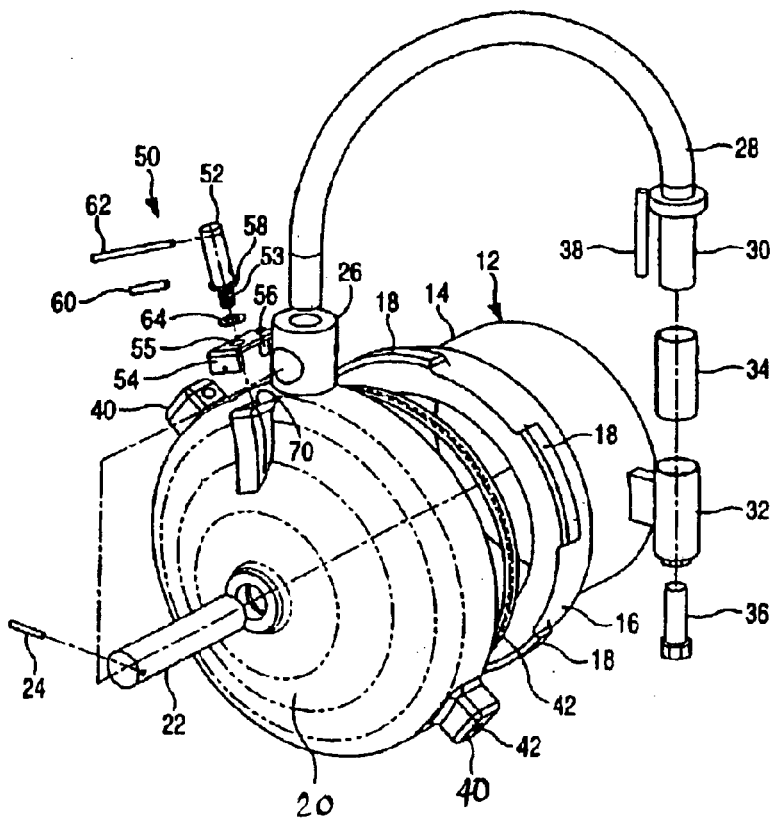
FIG. 2 is an exploded view of the assembly of FIG. 1.

FIGS. 1 and 2 show a closure assembly 10. A connector 12 has a hub or flange 14 that provides an opening through the connector 12 into the interior of a fluid or gas handling system. The flange 14 has an outer circumference 16 with a plurality of outwardly projecting arcuate lugs 18. The projecting lugs 18 are preferably equal in length and spaced at even arcuate intervals. However, in some circumstances it may be desirable to vary the length and/or spacing of the lugs 18.

A head or cover 20 is hingedly mounted to the flange 14 in such a way that it is rotatable relative to the flange 14 about the center axis of the flange 14. The head 20 also is movable generally axially versus the flange 14 into a closed position where it seals with the flange 14, and an open position where it is out of the way and access through the opening in the flange 14 is provided.

A hinged mounting of the head 20 is provided by a guide bar 22 and a pin 24 that secures the guide bar to a davit boss 26 connected to a davit arm 28. The davit arm 28 has a hinge pin 30 that can rotate within a neck assembly 32 mounted to the pipe section 12 via a bushing 34. An adjustor bolt 36 may be provided to provide compression to frictionally hold the hinge at a specific angular position, and an arm stop 38 may be provided to restrict the range of hinge motion.

The head 20 may also include a pair of hand grip projections 40, which allow the user to manually rotate the head 20. Although two projections are illustrated, the number and position of grips can vary and other handgrips can be provided. The projections 40 may include a bore or other tool-receiving portion that can receive a tool to provide additional leverage to rotate the head 20. The head 20 also has a flange 21 with a plurality of inwardly projecting arcuate lugs 23 (see FIGS. 5 and 6).

The basic interaction of the head 20 with the flange 14 is that the head 20 is rotated to a first, free, position where the lugs 18 on the flange 14 are at different angular positions from the lugs 23 on the head 20, and the lugs 18 and 23 do not interfere with each other. In this first free or open position, the head 20 can be freely moved axially off of the flange 14, and can also be manually urged forward against the flange 14. FIGS. 1 through 6 illustrate a first type of closure arrangement. Another type of closure arrangement having a variation on the lugs is illustrated in FIGS. 7 through 11 and described below.

Returning to FIGS. 1 through 6, a seal 42 maybe provided where the head 20 would contact the front surface of the flange 14 when the head 20 is closed. The seal is attached the inwardly facing surface of the head 20, which helps protect the seal 42 from damage. However the seal 42 may alternately be attached to the outwardly facing surface of the flange 14.

When the head is in the first rotary position, but has been urged axially against the flange 14 with a sufficient degree of pressure, so that the lugs 18 clear the lugs 23 in the axial direction, then it is possible to rotate the head 20 so that the lugs 23 of the head 20 rotate behind the lugs 18, providing an interference that retains the head 20 onto the flange 14. This provides positive closure of the head 20. The head 20 can be opened and removed by reversing the steps described above. It will be appreciated from the above that the lugs 18 and 23 serve as holding elements that hold the head 20 on the flange 14, and can provide a positive pressure seal.

Turning now especially to FIGS. 1, 2, 5 and 6, the illustrated closure arrangements also include a combined locking and pressure warning/release assembly 50. The combined locking and pressure warning/release assembly 50 includes a pressure warning/release screw 52 that is inserted through a deflector plate 54. The deflector plate 54 includes integrally therewith a locking pin 56. The deflector plate 54 is an L-shaped metal bracket with a bore 55 therethrough for receiving the pressure warning/release screw 52. The deflector plate 54 also has an integral locking pin 56 projecting therefrom as shown.

The pressure warning/release screw 52 has a lower flange 58 that is larger than the bore in the deflector plate 54, so that the pressure warning/release screw 52 is held in axial position with respect to the deflector plate 54. A pin 60 also assists with retaining the release screw 52 in the plate 54, so that when fully assembled the pressure warning/release screw 52 can rotate in the bore 55 in the deflector plate 54, but cannot move axially with respect to the deflector plate 54. When the pressure warning/release screw 52 is moved axially up and down, the deflector plate 54 necessarily moves up and down together with it. A bar 62 can be inserted through the top of the pressure warning/release screw 52 to facilitate manual rotation of the screw 52, and a dowty seal 64 can be provided under the flange 58 to provide sealing as described in more detail below.

Figure 3:
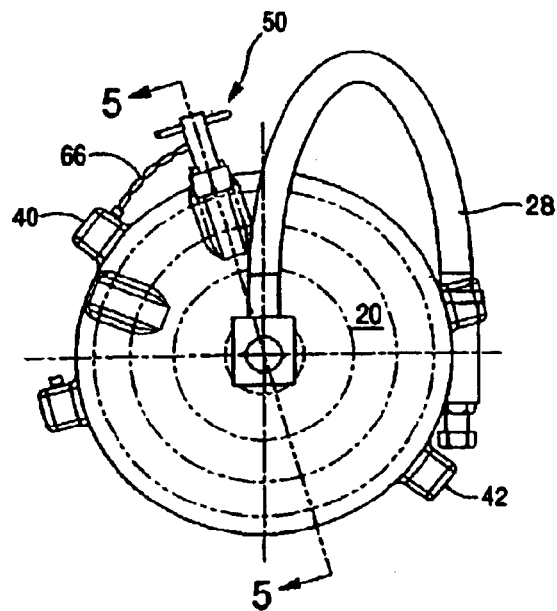
FIG. 3 is a front view of the assembly.
Figure 4:
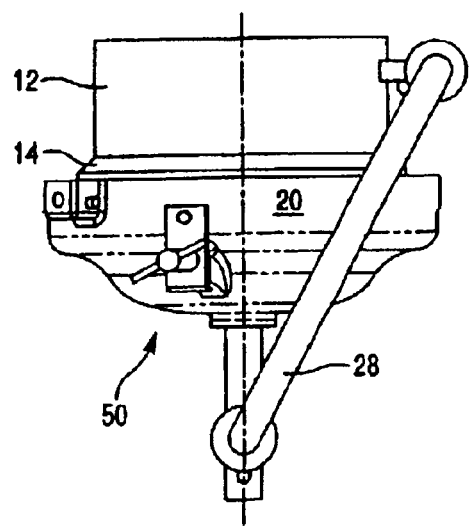
FIG. 4 is a top view of the assembly.

FIG. 3 illustrates a chain or other retaining strap 66 that may be provided to prevent loss or misplacement of the screw 52 when it is completely unscrewed and removed from the head 20. When the screw 52 and deflector plate 54 are assembled together, they cannot be disassembled without removing the pin 60, and thus the chain or restraining strap 66 provides a keeper device for the combined pressure warning/release and locking arrangement 50.

Turning particularly to FIGS. 5 and 6, it can be seen that when the head 20 and is in the fully closed position, a bore 70 that extends through the head 20 is aligned with a bore 72 that extends partially into the flange 14. In the illustrated example, the bore 72 extends into a lug 18 of the flange. The bores 70 and 72 are positioned so that they are aligned only when the head 20 is in a fully closed position. After the head 20 is rotated to the fully closed position, the locking pin 56 is inserted through bore 70, and the threaded end 53 of the pressure warning/release screw 52 is inserted into a threaded vent bore 73 that extends all the way through the head 20. As the screw 52 continues to be tightened, and the entire assembly 50 is urged downwardly as shown in FIGS. 5 and 6 until the flange 58 compresses the seal 64 against the countersunk surface provided around the opening of the bore 73. Thus, upon full tightening of the pressure warning/release screw 52, the vent bore 73 is sealed shut by the seal 64 and flange 58. The pin 60 holds down the deflector plate 54, which thus holds the locking pin 56 inserted through the bore 70 and projecting into the bore 72 as shown.

By virtue of this arrangement, it can be seen that tightening the pressure warning/release screw 52 not only closes off the fluid or gas from escaping out the vent bore 73, but also positively positions the locking pin 56 through the bore 70 and 72 bore to prevent rotation of the head 20. This provides a positive locking closed of the head 20.

In order to open the head 20, it is first necessary to remove the pressure warning/release screw 54 so that the pin 56 will clear at least the bore 72. Unscrewing the pressure warning screw this far, will necessarily involve releasing the seal of the pressure warning/release screw 54 on the vent bore 73, and thus permits (1) a warning to the user that pressure is present in the form of noticeable escaping gas or fluid and/or (2) the venting of any fluids or gas that are under pressure inside the system near the closure. If the pressure is a residual pressure, the operator may wait until no further escape is observed, and then proceed to open the head 20. However, in some closure arrangements, the system 50 is not intended to function on a main bleed or blowdown valve. In these closure arrangements if the pressure is significant, then the operator can re-tighten the screw 52, and proceed with a main bleed operation.

The deflector plate has an L-shaped front 57 as shown, so that any gas or fluid escaping under pressure will tend to be diverted downwardly along the front surface of the head 20, which minimizes the chance of the fluid or gas being sprayed in an undesirable direction.

Once the combined pressure warning/release and locking arrangement 50 has been unscrewed sufficiently so that pressure is released, and the locking pin 56 clears the bore 72, the head 20 can then be rotated so that the lugs 18 are no longer obstructing the lugs 23, and then the head 20 can be pulled axially open off the flange 14.

It can be seen from the above, that when the pressure warning/release screw 54 is unscrewed, the deflector plate 54 moves with it, and the locking pin 56 is retracted from its locking position. This releases the cap 20 so that it may be rotated to free to the lugs, at which point separation of the seal surfaces acts as a secondary pressure warning for the operation. Cap 20 can then be withdrawn from the flange 14 and swung fully clear while being supported on the davit 28. A benefit of such closure arrangements, is that the locking and safety features can be utilized by a single person without the need for special fools or wrenches. Further, a complete closure of the cap 20 can be assured before the system is pressurized, because in order for the pressure warning screw 52 to be fully seated, the combined pressure and locking mechanism must be fully engaged with the pin 56 in place.

The length of the threaded portion 53 and the length of insertion of the pin 56 into the bore 72 are dimensioned such that the screw 52 needs to be completely removed from the bore 73 before the pin 56 clears the bore 72. The pressure warning/release screw 52 does need to be completely removed from contact with the head 20 before opening of the head 20 is possible. This can provide a safety benefit by ensuring that the screw 52 is cleared and does not at all obstruct the vent 73 before the pin 56 is released from the hub bore 72. However, in other closure arrangements the screw 52 and pin 56 can be dimensioned to not require complete removal of the screw 52 before rotation of the head 20 is permitted. In either case, the screw 52 is rotated at least to a degree that it provides a warning and/or relieves internal pressure before the pin 56 clears the bore 72.

The vent 73 and associated pressure warning/release screw 52 are provided in the head 20. However, in other closure arrangements, the vent 73 could extend through part of the flange 14 or the connector 12 and be closed by the screw 52. Also the bore 70 does not pass through the lug 23, and the bore 72 extends partially into a lug 18 so it does not pass through lug 18. Alternatively, the bore 70 could extend through the lug 23, the bore 72 can be positioned on a part of the flange 14 inward of the lug 18. Also, while it is preferred to have the location of the bores 70 and 72 be positioned in the circumference to be within the arcuate lug overlap area, it is possible to put the bores 70 and 72 anywhere around the circumference of the closure assembly.

To close and lock the closure assembly, the user rotates the head 20 to the closed position. Next, the user installs the pressure warning/release and locking system 50 by tightening the pressure warning/release screw 52 fully, which will also seal the vent 73. Due to the configuration of the combined system 50, the pin 56 will extend into the bore 72 sufficiently to prevent rotation of the head 20, and prevent any opening of the head 20 until the pressure warning/release screw 52 is again released.

FIGS. 7 through 11 depict further examples of closure arrangements. These closure arrangements include a combined pressure warning/release and locking system 50 similar to that described above. A characteristic of these closure arrangements is that a stepped secondary lug 80 is provided on the head 20 adjacent to lug 23. A stop pin 82 is also provided on the flange 14. In FIGS. 7, 8 and 9, the outer ring of the door 20 has been cut away to permit the shape of the lug 23 and secondary lug 80 to be visible.

FIG. 7 shows the head 20 in a closed position with the pressure warning/release screw 52 screwed in. FIG. 8 shows the pressure warming screw 52 having been removed sufficiently so that the lock pin 56 clears the bore 72, permitting rotation of the head 20. FIG. 7 shows the head 20 rotated by a specific angle of rotation until the lug 23 on the head 20 contents to stop pin 82. In FIG. 8, the head 20 has been rotated up until the lug 23 contacts the stop pin 82. At this point the secondary lug 80 is still interfering with its corresponding lug 14. If a sufficient internal pressure is present, the head 20 will be forced outwardly until the secondary lug 80 contacts the lug 14. Thus, in FIG. 8, the head 20 has been rotated to a point where the head 20 will be pushed out partially, but due to the interaction of the lugs 80 and 14, will not forcefully be pushed fully off by a undesirable distance. If no significant internal pressure is present, the operator may simply urge the head axially forward into the position shown in FIG. 9. This is also the position at which the head 20 arrives at if forced out by significant internal pressure.

In FIG. 9, the head has moved axially far enough so that the seal is broken and the pressure has been released. The forward movement of the head 20 permits the lug 23 to clear the stop pin 82. The user then continues to rotate the head 20 into the position shown in FIG. 10. The lug 14 is now fully clear of lugs 23 and 80, and the head 20 may be pulled forward into the position shown in FIG. 11. In FIGS. 7, 8 and 9, the outer ring of the door 20 has been cut away to permit the shape of the lug 23 and secondary lug 80 to be visible.

Such closure arrangements may be scaled into any suitable size. Examples of throughbores which may be preferred include diameters from 4 to 12 inches, 4 to 24 inches, with working pressures up to ANSI 300 (740 psi/51.1 bar) and temperatures from −50 F. to 400 degrees F. Diameters up to 12 inches may be even more preferable. Hub 14 can preferably be constructed, of forged carbon steel. For example, the hub 14 can be constructed from SA 350-LF 2 material. A benefit of using this material is that it can avoid the need for special field welding techniques or procedures.

The cap 20 may preferably be manufactured from cast carbon steel SA 352-LCB material using 100% radiography in accordance with ASME/ASTM E446 compliance to level 3. The head 20 can be drilled with for example, M16 metric thread or a one half inch UNC thread into which the pressure warning screw 52 locates. The vent hole 73 can be sized large enough to minimize the risk of blockage.

The seal 42 can be a fully molded lip seal available in Nitrile (NBR) and fluoro elastimer material. The seal is preferably located in the head 20 to prevent operational damage, and the use of a lip design prevents metal to metal binding which is often experienced when using 0-rings.

Figure 12:
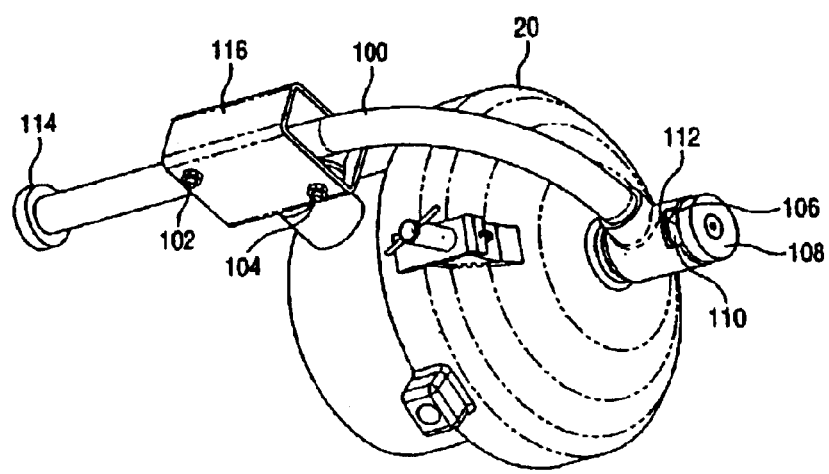
FIG. 12 is a perspective view showing a closure arrangement according to a first embodiment of the present invention.

A side hinged davit arm arrangement is illustrated in FIGS. 1–11. However, other side hinging arrangements may be used, as well as vertical top opening arrangements. FIG. 12 is perspective view of a horizontal closure arrangement employing a hinge and davit arrangement according to a first embodiment of the invention. The head 20 is mounted on the davit arm 100 that slides along rollers 102 and 104. A pin 106 extends from a shaft 108 on the head 20 and travels within a slot 110 on a fitting 112 that is at the end of the davit arm 112. This permits the head 20 to be rotated by a desired range for closing and opening the head 20 is opened, it can be moved laterally by the davit arm 100 sliding on the rollers 102 and 104. A stop 114 may be provided at the davit arm 100 to limit the axial travel of the head 20. The rollers 102 and 104 are mounted in a housing 116 that can pivot about a vertical axis, so that when the closure is opened and moved axially off the flange, the head 20 can be swung laterally out of the way to permit access into the opening.

As shown in FIG. 12 the rollers 102 and 104 are concave, and taper from their ends to a central region. In addition, the rollers 102 and 104 are shaped to substantially match the curvature of the davit arm 112. Hence, the rollers 102 and 104 support the davit arm 100 in the housing 116, and prevent lateral movement of the davit arm 100 relative to the housing 116. Furthermore, the concave shape of the rollers 102 and 104 allows the davit arm 112 to rotate about its longitudinal axis. Thus the head 20, supported by the davit arm 100, can be rotated about the longitudinal axis of the davit arm away to one side of the hub 14. This helps a user align the head 20 with the hub 14 when placing the head 20 on the hub 14. On aligning the head 20 with the hub 14 the user can rotate the head 20 relative to the hub 14 about the longitudinal axis of the davit arm 100. This allows the user to move the head 20 along a circular path that traces around the longitudinal axis of the davit arm 100. Small movements of this type can help the user place the head 20 on the hub 14, as the user can swivel the head 20 relative to the hub 14 to help the user align the lugs on the head 20 and the hub 14.

This embodiment of the present invention allows the head 20 to be moved to and away from the hub 14 along the longitudinal axis, swiveled in a horizontal plane to and away from the opening of the hub 14, and rotated about the longitudinal axis to allow fine adjustment of the head 20 and the hub 14.

Figure 13:
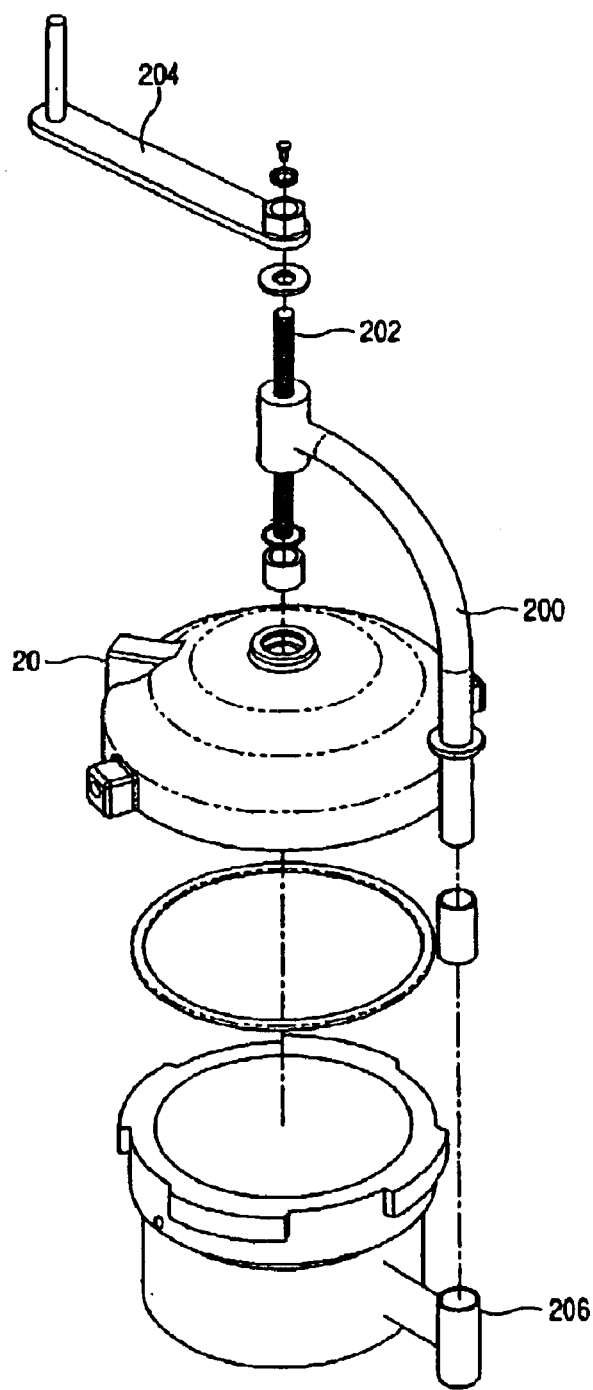
FIG. 13 is a perspective view that shows a hinge and davit arrangement for vertical closures.

FIG. 13 illustrates a closure arrangement for providing a hinge on a vertically oriented closure. A hinged davit arm 200 extends vertically upward and supports a threaded connection 202 that supports the head 20 vertically. Rotating the handle 204 will lift or lower the head 20, and the davit arm 200 rotates in a hinge bore 206 to move the head 20 out of the way once it has been opened.

Figure 14:
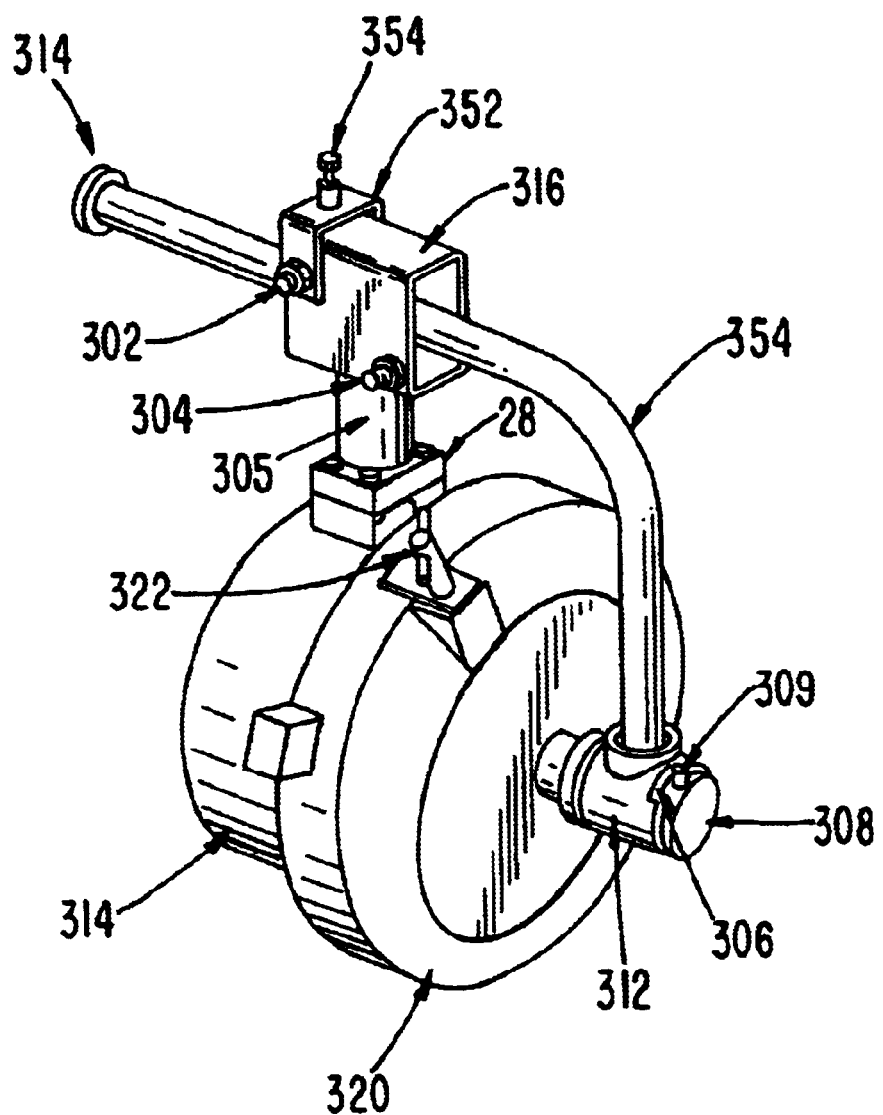
FIG. 14 is a perspective view showing a closure arrangement according to a second embodiment of the present invention.
Figure 15:
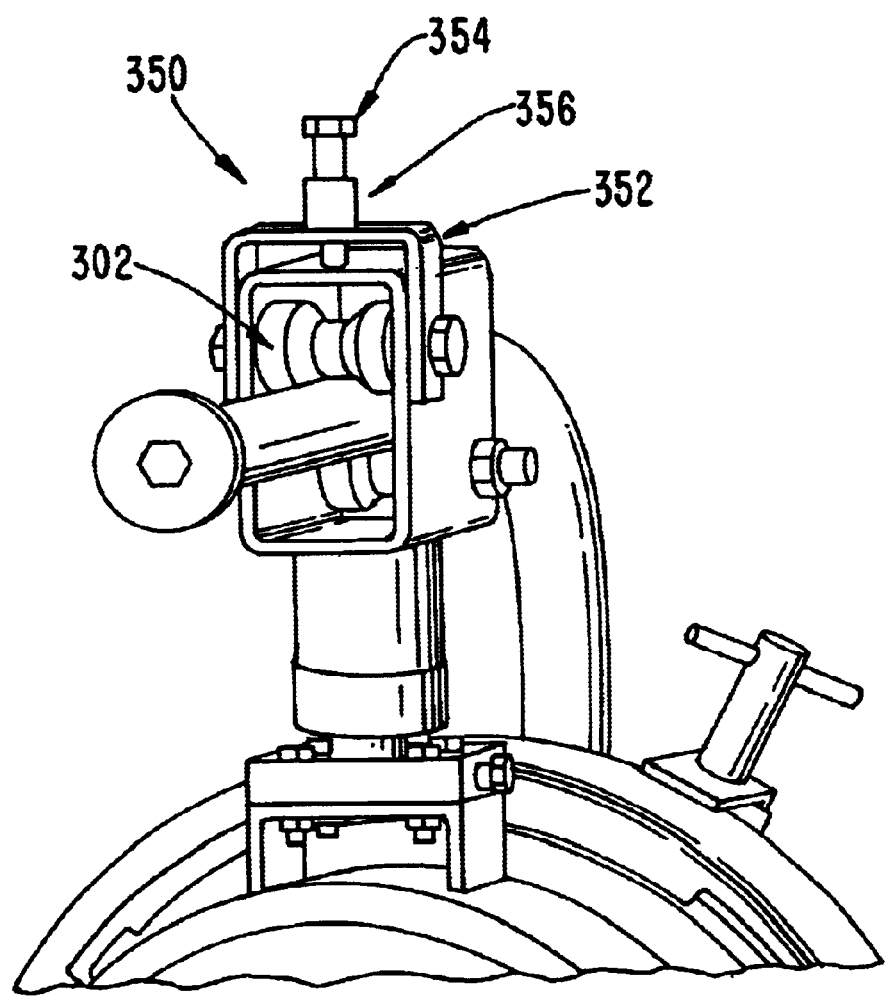
FIG. 15 is a detailed perspective view of the housing of the closure arrangement shown in FIG. 14.

FIGS. 14 and 15 illustrate a horizontally orientated closure arrangement of a second embodiment of the invention. The closure arrangement comprises a head 320, a hub 314, a pressure warning/release assembly, and a hinge and davit arrangement for supporting the head 320 when it is separated from the hub 314. The hinge and davit comprises a davit arm 300 that is rotatably connected to at one end to a fitting 312 that is journaled to a shaft 306. The shaft 306 is connected to the head 320, and the fitting 312 is kept in place on the shaft 306 by a stop 308. Thus the head 320 can rotate around the shaft 306 relative to the davit arm 300. The degree of rotation is limited by a peg 309 extending from the shaft 306 to engage a slot in the fitting 312. The limited rotation is sufficient to enable the head 320 to be engaged and disengaged from the hub 314.

The hinged davit arm 300 is mounted in a swivel mounted housing 316. The housing 316 is connected to a connecting portion 28 on the hub 314 by a connecting shaft 305. The housing 316 can pivot about a vertical axis, so that when the closure is opened and the head 320 moved axially off the hub 314, the head 320 can be swung laterally out of the way to permit access into the opening. The housing 316 comprises rollers 302 and 304 that allow the davit arm 300 to move relative to the housing 316 in an axial direction and to rotate about its longitudinal axis relative to the housing 316. The rollers 302 and 304 are concave, and taper from their ends to a central region. The rollers 302 and 304 are shaped to substantially match the curvature of the davit arm 300. Hence, the rollers 302 and 304 support the davit arm 300 in the housing 316, and prevent lateral movement of the davit arm 300 relative to the housing 316. Furthermore, the concave shape of the rollers 302 and 304 allows the davit arm 300 to rotate about its longitudinal axis. Thus the head 320, supported by the davit arm 300, can be moved axially towards and away from the hub 314 and rotated about the longitudinal axis of the davit arm 300 away to one side of the hub 314. One roller 304 is arranged below the davit arm 300 at a position towards the head 320. The other roller 302 is arranged above the head 320 at a position away from the head 320.

The hinge and davit arrangement further comprises an adjustment device 350, which is provided to allow the adjustment of the vertical position the roller 302 within the housing 316. A close up perspective view of the adjustment device 350 and housing 316 is shown in FIG. 15.

The adjustment device 350 comprises a generally U-shaped stop plate 352 connected to the roller 302 at its free ends. Each end of the roller 302 extends through corresponding slots located at opposite sides of the housing 316. The roller 302, connected to the stop plate 352, can move vertically in the slots relative to the housing 316. The adjustment device 350 also comprises a screw thread 354 that is connected to the housing 316 at one end and projects vertically from the housing 316 through the stop plate 352. The stop plate 352, connected to the roller 302, can thus move vertically relative to housing 316 along the screw thread 354.

An adjustment nut 356 is located on the screw thread 354, and adjusting the position of the nut 156 limits the maximum vertical position of the stop plate 352. As the stop plate 352 is connected to the roller 302 the position of the nut 356 limits the maximum vertical position of the roller 302.

When the head 320 is separated from the hub 314 gravity will tend to urge the head 320 in a downwards direction. If the head 320 were permitted to move downwards relative to the hub 314, the davit arm 300 would be rotated in such a way so as to urge the roller 302 upwards. Hence, unless otherwise supported, the davit arm 300 will tend to urge the roller 302 upwards when the head 320 is separated from the hub 314.

Adjusting the vertical position of the roller 302 relative to the housing 316 will adjust the angle of inclination the davit arm 300 relative to the hub 314. When the head 320 is separated from the hub 314, adjusting the angle of inclination the davit arm 300 relative to the hub 314 will adjust the vertical position of the head 320 relative to the hub 314. Relatively small angular adjustments of the davit arm 300 lead to relatively large adjustments of the vertical position of the head 320 relative to the hub 314.

Thus the adjustment device 350 permits the adjustment of the vertical position of the head 320 relative to the hub 314. The user can also rotate the head 320 relative to the hub 314 about the longitudinal axis of the davit arm 300, which provides for a degree of horizontal adjustment. Thus the closure arrangement of FIG. 14 provides the user with a support device that supports the head 320 when separated from the hub 314, whist allowing the user freedom to adjust the vertical and horizontal position of the head 320 relative to the hub 314.

This freedom to adjust both the vertical and horizontal position of the head 320 relative to the hub 314 is highly beneficial when aligning the head 320 with the hub 314. Without this degree of freedom to adjust the position of the head 320 relative to the hub 314 the user can find it difficult to align the head with the hub. Closure arrangements can be large, and the heads of such arrangements can be very heavy, and for example aligning the lugs on the head 320 with the lugs on the hub 314 can be difficult.

Other embodiments of the invention could employ alternative means for adjusting the vertical position of the roller 302. For example, the housing 316 could comprise a spring adapted to limit the vertical position of the roller 302. Furthermore, embodiments of the invention could employ adjustment of the roller 304, either in addition to or instead of the adjustment of the roller 302. In addition, embodiments of the invention need not employ concave rollers, and could employ a different means for allowing the davit arm to rotate about its longitudinal axis.

Figure 16:
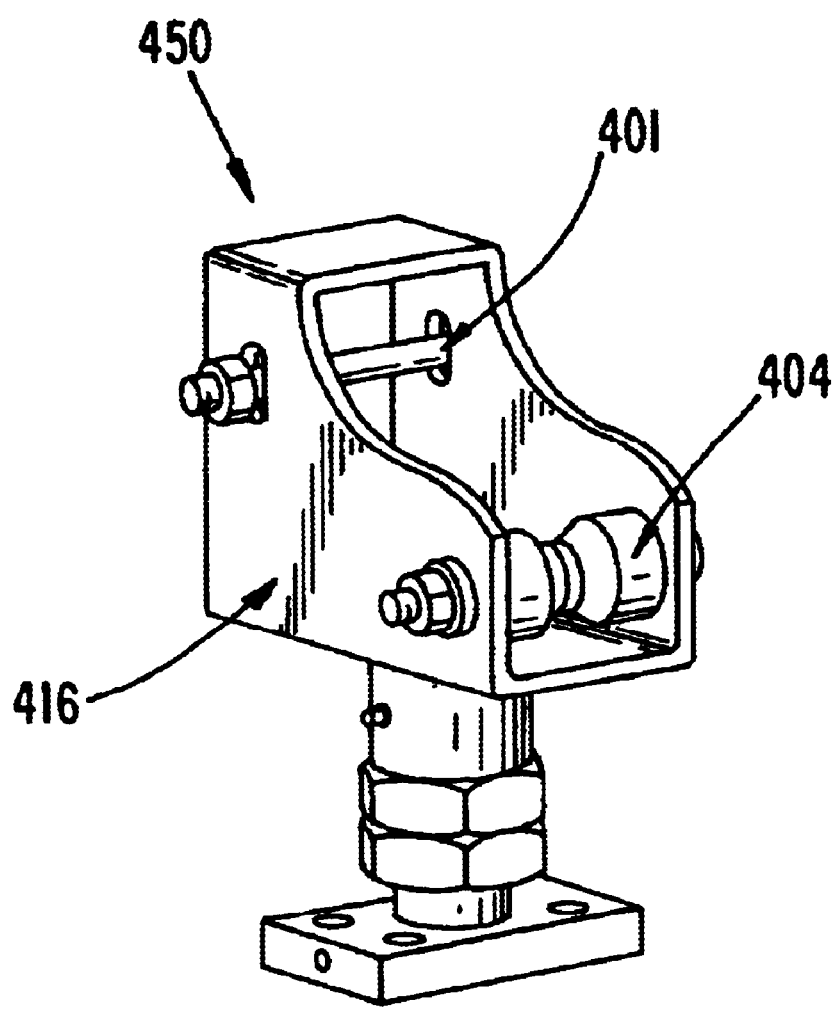
FIG. 16 is a partial cutaway view of a housing of closure arrangement according to a third embodiment of the invention.

FIG. 16 is a partial cutaway view of the housing 416 of a closure arrangement according to a third embodiment of the invention. The closure arrangement in this embodiment is substantially similar to that shown in FIGS. 14 and 15 and comprises a head 420, a hub 414, a housing 416 mounted on the hub 414 that can swivel in a plane, and a davit arm 400 mounted in the housing 416 to move in a longitudinal direction in the plane and to rotate about the longitudinal direction. In this embodiment the housing 416 comprises one concave roller 404 arranged on the lower side of the davit arm 400, and a bar 401 arranged on the upper side of the davit arm 400. The housing further comprises an adjustment device 450, which is provided to allow adjustment of the vertical position of the bar 401. The adjustment device 450 comprises two corresponding slots located at opposite sides of the housing 416. The bar is free to move vertically in the slots, which permits the adjustment of the angle of inclination of the davit arm 400 relative to the hub 414.

The application of the hinge and davit arrangements shown in FIGS. 14, 15 and 16 are not limited to lug type closure arrangements, and could be used on any type of closure arrangement, such as a bolt type closure arrangement, a ring clamp closure arrangement and a screw type closure arrangement.

For example, in a screw type closure arrangement it can also be difficult for a user to align the screw thread of the head with the corresponding screw thread on the hub. The provision of a support device that allows for vertical and horizontal adjustment of the head relative to the hub can make aligning the screw thread on the head with the screw thread on the hub much easier.

Where lug type arrangements are shown, quarter-turn lug arrangements are shown, however, other suitable lug arrangements may be utilized. Further, although the background and preferred embodiments in this application refer to certain industrial processes, the invention is not limited to a particular industrial application, process, material, application or range of sizes.

The many features and advantages of the invention are apparent from the detailed specification, and thus, it is intended by the appended claims to cover all such features and advantages of the invention which fall within the true spirits and cope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. An apparatus for locking a closure assembly in a closed position, the apparatus comprising:
    a hub having an opening therethrough;
    a head removably attachable to said hub via a lug-type holding arrangement and movable between an open position and a closed position;
    a releaseable lock element movable between an unlocked position and a locked position that locks said head in the closed position;
    a pressure warning/release device movable between a sealed position and a warning position, and which is operably connected to said locking element so that the pressure warning/release device must be in the warning/release position in order for the locking element to be unlocked; and
    a support device comprising a swivel mount housing arranged on said hub and a davit arm mounted in said swivel mount housing and attached to said head at one end, wherein said swivel mount housing is arranged to allow said davit arm to swivel on said hub in a plane and comprises two concave rollers, wherein said davit arm is adapted to cooperate with said concave rollers to allow said davit arm to move in a longitudinal direction in said plane relative to said swivel mount housing and to swivel about said longitudinal direction.

2. An apparatus according to claim 1, wherein said concave rollers are displaced along said longitudinal direction to support said davit arm, one said concave roller is arranged on an upper side of said davit arm at a position away from said head, and the other said concave roller is arranged on a lower side of said davit arm at a position towards said head.

3. An apparatus according to claim 1, wherein said pressure warning/release device includes a plate element, and wherein said sealing element includes a threaded screw rotatably mounted in said plate element.

4. An apparatus according to claim 3, wherein said lock element has a projection that projects from said plate element.

5. An apparatus according to claim 3, wherein tightening the screw by a predetermined amount moves said locking element to said locked position and untightening the screw by a predetermined amount moves said locking element into said unlocked position.

6. An apparatus according to claim 1, wherein said lug type holding arrangement further includes a secondary lug arrangement providing a stepped profile.

7. An apparatus according to claim 1, wherein said lug type holding arrangement comprises at least one first lug projecting from said hub and a head having at least one second lug projecting from said head, wherein said head is rotatable between an unlocked position where said lugs do not interfere with each other and said head may be removed from said hub, and a closed position where said lugs at least partially overlap each other and interfere with each other so that said head is held in a sealing engagement with said hub; and the apparatus including:
    a vent bore passing through at least one of said head and said hub;
    a first locking bore passing through said head; and
    a second locking bore extending at least partially into said hub that is aligned with said first locking bore when said head is in said closed position;
    wherein said pressure warning/release device comprises a sealing element adapted to seal the vent bore when in a sealing position and said releaseable lock element comprises a projection that projects into said first and second bores when said head is in said closed position and said sealing element is in said sealing position.

8. An apparatus according to claim 7, wherein said seal and lock device includes a plate element, and wherein said sealing element includes a threaded screw rotatably mounted in said plate element and threadable into said vent bore to seal said vent bore.

9. An apparatus according to claim 8, wherein said projection projects from said plate element.

10. An apparatus according to claim 8, wherein said screw is adapted so that the tightening said screw by a predetermined amount seals said vent bore, and the untightening of said screw by a predetermined amount retracts said projection from said second bore.

11. An apparatus according to claim 7, wherein said second lug further includes a secondary lug providing a stepped profile.

12. A closure arrangement comprising a hub, a head adapted to be disengageable from said hub, a support device adapted to support said head when separated from said hub, wherein said support device comprises a swivel mount arranged on said hub and a davit arm mounted on said swivel mount and attached at one end to said head, wherein said swivel mount is arranged to allow said davit arm to swivel in a plane, said davit arm is mounted on said swivel mount to move in a longitudinal direction in said plane relative to said swivel mount to swivel about said longitudinal direction, and said support device further comprises an adjustment device adapted to adjust the position of said head relative to said hub in a direction perpendicular to said plane, wherein said adjustment device is adapted to adjust the angle of inclination of said davit arm relative to said hub in order to adjust the position of said head relative to said hub in a direction perpendicular to said plane.

13. A closure arrangement comprising a hub, a head adapted to be disengageable from said hub, a support device adapted to support said head when separated from said hub, wherein said support device comprises a swivel mount arranged on said hub and a davit arm mounted on said swivel mount and attached at one end to said head, wherein said swivel mount is arranged to allow said davit arm to swivel in a plane, said davit arm is mounted on said swivel mount to move in a longitudinal direction in said plane relative to said swivel mount to swivel about said longitudinal direction, and said support device further comprises an adjustment device adapted to adjust the position of said head relative to said hub in a direction perpendicular to said plane, wherein the swivel mount comprises two concave rollers, and wherein the adjustment device comprises adjusting means for adjusting the position of at least one said roller.

14. A closure arrangement according to claim 13, wherein said concave rollers are displaced along said longitudinal direction, one said concave roller is arranged on an upper side of said davit arm at a position away from said head and the other said concave roller is arranged on a lower side of said davit arm at a position towards said head, and said adjusting means comprises means for lowering said concave roller at said upper side of said davit arm or raising said concave roller at said lower side of said davit arm.

15. A method for locking a closure assembly in a closed position for use with a hub having an opening therethrough and a head removably attachable to said hub via a lug-type holding arrangement, the method comprising:
    moving a pressure warning/release device from a sealed position to a warning position, the warning/release device operably connected to a locking device that operates to withdraw a projection from said lug-type holding arrangement, so that said pressure warning/release device must be in a warning position in order for the locking device to be unlocked; and
    providing a support device comprising a swivel mount housing on said hub and a davit arm mounted in said swivel mount housing and attached to said head at one end, the method comprising providing said swivel mount housing with two concave rollers, using said swivel mount housing to allow said davit arm to swivel on said hub in a plane, using said concave rollers to allow said davit arm to move in a longitudinal direction in said plane relative to said swivel mount housing and to swivel about said longitudinal direction, the method further comprising displacing said concave rollers along said longitudinal direction, arranging one said concave roller on an uppers side of said davit arm at a position away from said head, and arranging the other said concave roller on a lower side of said davit arm at a position towards said head.

16. A method according to claim 15, wherein said pressure warning/release device is a screw threadably received in a vent, and moving said pressure warning/release device from said sealed position to said warning position comprises unscrewing said screw.

17. A method according to claim 15, wherein moving said pressure warning/release device from said sealed position to said warning position effects unlocking of said locking device.

18. A method according to claim 16, wherein moving said pressure warning/release device from said sealed position to said warning position effects unlocking of the locking device.

19. A method according to claim 15, further comprising disengaging lugs of said lug-type holding device and removing said head from said hub after said locking device is unlocked.

20. A method of operating a closure assembly comprising providing a hub, a head adapted to be disengageable from said hub, a support device adapted to support said head when separated from said hub, the method comprising providing said support device with a swivel mount arranged on said hub and a davit arm mounted on said swivel mount and attached at one end to said head, using said swivel mount to allow said davit arm to swivel in a plane, using said swivel mount to allow said davit arm to move in a longitudinal direction in said plane relative to said swivel mount, and using said swivel mount to allow said davit arm to swivel about said longitudinal direction, the method further comprising providing said support device with an adjustment device to adjust the position of said head relative to said hub in a direction perpendicular to said plane, using said adjustment device to adjust the angle of inclination of said davit arm relative to said hub in order to adjust the position of said head relative to said hub in a direction perpendicular to said plane.

21. A method of operating a closure assembly comprising providing a hub, a head adapted to be disengageable from said hub, a support device adapted to support said head when separated from said hub, the method comprising providing said support device with a swivel mount arranged on said hub and a davit arm mounted on said swivel mount and attached at one end to said head, using said swivel mount to allow said davit arm to swivel in a plane, using said swivel mount to allow said davit arm to move in a longitudinal direction in said plane relative to said swivel mount, and using said swivel mount to allow said davit arm to swivel about said longitudinal direction, the method further comprising providing said support device with an adjustment device to adjust the position of said head relative to said hub in a direction perpendicular to said plane, providing said swivel mount with two concave rollers, and using said adjustment device to adjust the position of at least one said roller.

22. A method of operating a closure assembly according to claim 21, the method further comprising displacing said concave rollers along said longitudinal direction, arranging one said concave roller on an upper side of said davit arm at a position away from said head, and arranging the other said concave roller on a lower side of said davit arm at a position towards said head, and using said adjusting means to lower said concave roller at said upper side of said davit arm or raise said concave roller at said lower side of said davit arm.

23. An apparatus for locking a closure assembly in a closed position for use with a hub having an opening therethrough and a head removably attachable to said hub via a lug-type holding arrangement, the apparatus comprising:
    a releaseable locking means moveable between an unlocked position; and a locked position which locks said head in a closed position; and
    a pressure warning/releasing means moveable between a sealed position and a warning position, said warning means operably connected to said locking means type so that said pressure warning/releasing means must be in a warning/releasing position in order for said locking means to be unlocked;
    a support means comprising a swivel mount housing on said hub and a davit arm mounted in said swivel mount housing and attached to said head at one end, wherein said swivel mount housing is arranged to allow said davit arm to swivel on said hub in a plane and comprises two concave rollers, wherein said davit arm is adapted to cooperate with said concave rollers to allow said davit arm to move in a longitudinal direction in said plane relative to said swivel mount housing and to swivel about said longitudinal direction, said concave rollers are displaced along said longitudinal direction to support said davit arm, one said concave roller is arranged on an upper side of said davit arm at a position away from said head, and the other said concave roller is arranged on a lower side of said davit arm at a position towards said head.

24. An apparatus according to claim 23, wherein said pressure warning/releasing means is provided by a threaded screw rotatably mounted in a plate element.

25. An apparatus according to claim 24, wherein the releasable locking means including a projection that projects from the plate element.

26. An apparatus according to claim 23, wherein said lug type arrangement further includes a secondary lug arrangement providing a stepped profile.

27. An apparatus according to claim 24, wherein the tightening said screw by a predetermined amount moves said locking means to said locked position, and untightening said screw by a predetermined amount moves said locking means to said unlocked position.

* * * * *